(No Model.)
E. B. TURNER.
COFFEE POT.
No. 425,473. Patented Apr. 15, 1890.
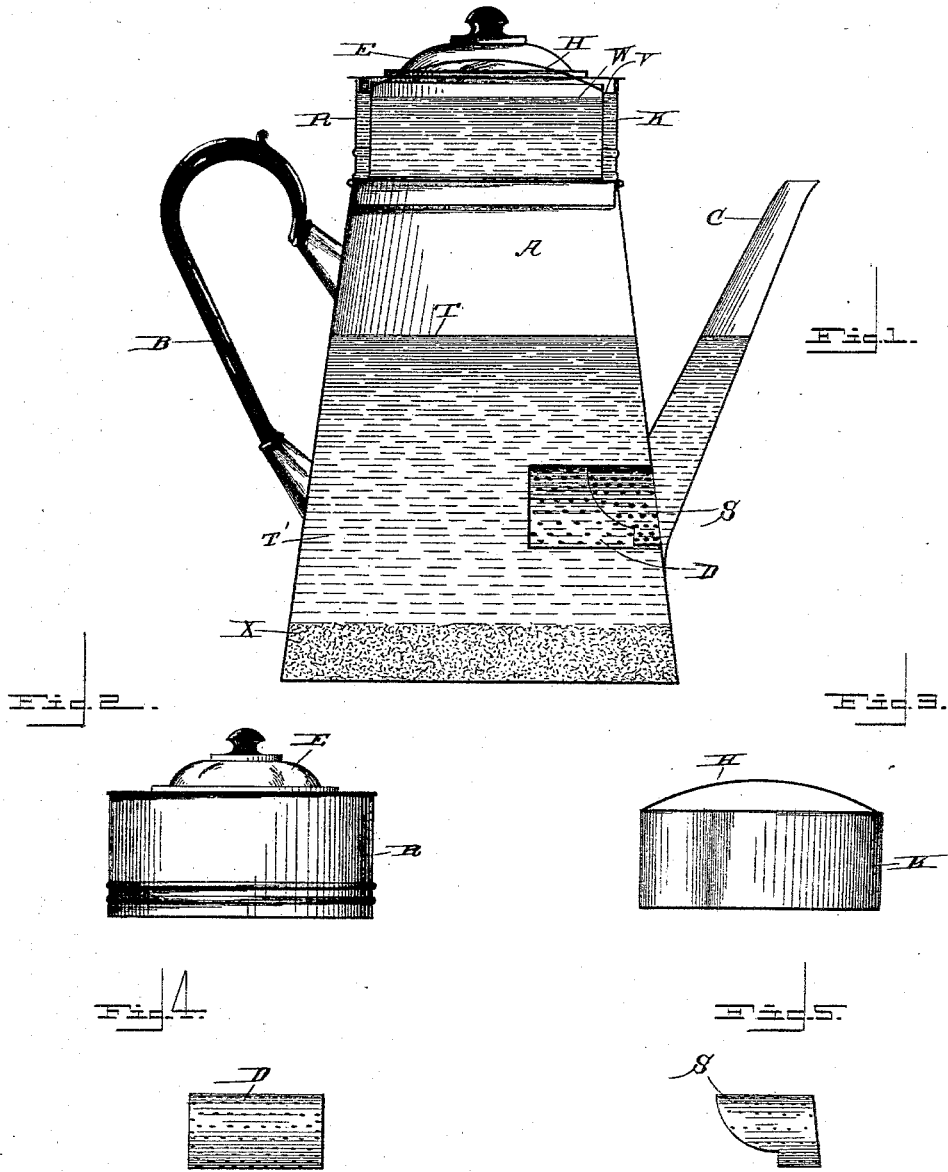
WITNESSES
Walter W. Pumphrey
T. H. Brown
INVENTOR
Edwin B. Turner
By Butterworth, Hall, Brown & Smith
his Attorneys

UNITED STATES PATENT OFFICE.

EDWIN B. TURNER, OF ELMIRA, NEW YORK.

COFFEE-POT.

SPECIFICATION forming part of Letters Patent No. 425,473, dated April 15, 1890.

Application filed January 2, 1890. Serial No. 335,644. (No model.)

*To all whom it may concern:*

Be it known that I, EDWIN B. TURNER, a citizen of the United States, residing at Elmira, in the county of Chemung and State of New York, have invented certain new and useful Improvements in Coffee-Pots; and I do hereby declare the following to be a full, clear, and exact description of the invention, such as will enable others skilled in the art to which it appertains to make and use the same.

My invention consists in the improved coffee or tea pot hereinafter to be described and claimed.

In the drawings, Figure 1 is a vertical section through my improved coffee-pot, showing the internal arrangement thereof. Fig. 2 is a detail of the reservoir or condenser. Fig. 3 is a detail of the cup in said reservoir. Fig. 4 is a detail of the cylindrical strainer, and Fig. 5 is a detail of the spur attached to the base of the spout.

In constructing a coffee or tea pot the ends to be attained are an adequate straining device, whereby the dregs of coffee or tea-leaves may be prevented from floating out into the spout and thence into the cup, and in having such straining device capable of being readily cleansed, and also the provision of a suitable condensing apparatus, whereby the steam generated in the pot may be condensed, instead of being discharged into the open air, carrying with it the most valuable part of the aroma and flavor of the substance which is being steeped in the pot. To accomplish these objects I have designed the coffee-pot, in which A is the body of the pot, of usual form, having the handle B and the spout C. At the base of the spout C is placed a projecting spur S, of any suitable shape, formed of perforated metal, wire-gauze, or some equivalent substance. This spur projects into the body of the pot, and over it may be slipped the cylinder D, also composed of some perforated material. This cylinder is closed at one end and open at the other, so that it may be slipped over the spur, as shown in Fig. 1.

My improved form of condenser consists of the reservoir tightly fitting on the top of the pot, so that no steam can escape. This reservoir R has a cover E, of the usual kind, and in the reservoir, loosely fitting but nearly filling the same, is the cup K, which may be taken hold of for removal or insertion by the handle H.

In Fig. 1, T represents the water-line of the solution of coffee or tea in the pot, while X represents the dregs thereof. V represents the water-line in the reservoir R, and W the water-line in the cup K.

The method of operation of the various features of my invention is, the cylinder D of the strainer may be readily removed by hand for cleaning and as readily replaced. When in position, it, together with the spur S, presents a large straining-surface to the liquid in the pot, and consequently an unrestricted flow of fluid through the spout is obtained, and the liability of the strainer to become clogged is greatly reduced. The removability of the cylinder facilitates its being cleaned, and also permits the lower end of the spout C to be thoroughly cleansed, while in the ordinary construction of a fixed strainer dirt collects at the base of the spout, and cannot readily be removed.

When the condenser is to be used, the bottom of the reservoir R is covered by a thin film of water, and the cup K, nearly filled with water, is placed in the reservoir. The action of the said cup is of course to force the water in the reservoir up to or approximately to the water-line V, as shown in Fig. 1, and this insures a film of water between the bottom of the cup and the bottom of the reservoir. This is a good conductor of heat, and, being kept cold by the large mass of cold water in the cup over it, it causes the steam rising from the coffee or tea within the pot to condense on the under side of the reservoir or condenser and drop back into the pot. If the above action has heated the water in the cup K, so that it would no longer abstract the necessary heat, and consequently would not condense the steam, the cup may be easily removed, emptied, and replaced after being filled with cold water. As the cup fits loosely in the reservoir, this can be done without disturbing the coffee-pot or exposing the operator to the danger of burning, as might occur if the entire reservoir, which fits tightly in the pot, had to be removed for refilling. Moreover, this removal would allow the steam generated during its removal to escape.

Having therefore described my invention, what I claim as new, and desire to protect by Letters Patent, is—

1. In an improved coffee-pot, the combination of the spur of perforated metal projecting into the pot from the base of the spout and the cylinder of perforated metal open at one end which slides over said spur, substantially as described.

2. In an improved coffee-pot, the combination of the water-tight reservoir, which fits tightly into the top of said pot, and the cup, which fits loosely into and nearly fills said reservoir, substantially as described.

3. In an improved coffee-pot, the combination of the water-tight reservoir, which fits tightly into the top of said pot, and the cup, provided with a suitable handle, which fits loosely into and nearly fills said reservoir, substantially as described.

In testimony whereof I affix my signature in presence of two witnesses.

EDWIN B. TURNER.

Witnesses:
G. DANA RHODES,
CHAS. W. STUART.